United States Patent
Celik

(10) Patent No.: US 11,240,242 B1
(45) Date of Patent: Feb. 1, 2022

(54) SYSTEM AND METHOD FOR PROVIDING A ZERO TRUST NETWORK

(71) Applicant: REVBITS, LLC, Melville, NY (US)

(72) Inventor: Mucteba Celik, Jersey City, NJ (US)

(73) Assignee: Revbits, LLC, Melville, NY (US)

( * ) Notice: Subject to any disclaimer, the term of this patent is extended or adjusted under 35 U.S.C. 154(b) by 0 days.

(21) Appl. No.: 17/403,020

(22) Filed: Aug. 16, 2021

Related U.S. Application Data

(60) Provisional application No. 63/218,660, filed on Jul. 6, 2021.

(51) Int. Cl.
*H04L 29/06* (2006.01)
*H04L 12/46* (2006.01)

(52) U.S. Cl.
CPC ...... *H04L 63/0884* (2013.01); *H04L 63/1408* (2013.01); *H04L 12/4641* (2013.01); *H04L 29/06612* (2013.01)

(58) Field of Classification Search
CPC ............. H04L 63/0884; H04L 63/1408; H04L 12/4641; H04L 29/06612
See application file for complete search history.

(56) References Cited

U.S. PATENT DOCUMENTS

| | | | |
|---|---|---|---|
| 10,110,585 B2 | 10/2018 | Ghafourifar et al. | |
| 10,581,876 B2 | 3/2020 | Elgressy et al. | |
| 10,749,885 B1* | 8/2020 | Hoorvitch | H04L 63/08 |
| 10,904,240 B2 | 1/2021 | Bosch et al. | |
| 2018/0295134 A1* | 10/2018 | Gupta | H04L 67/28 |

\* cited by examiner

*Primary Examiner* — Huan V Doan
(74) *Attorney, Agent, or Firm* — Mandelbaum Silfin Economou LLP

(57) ABSTRACT

A system and method for providing remote zero trust access to a private network. A cloud server provides a user at a remote device with access to the private network. A proxy server interfaces between the remote device and the private network. A web interface initiates a session with the user. The proxy server allows the user to enter login credentials, verifies the entered login credentials, provides a dashboard page for displaying a list of assets available to the user at the private network, establishes a first remote session between a client at the remote device and the proxy server, establishes a second remote session between the proxy server and a proxy agent at the remote server, and informs the proxy agent of a selected asset, and enables the user to access the selected asset via the first remote session, the second remote session, and the proxy agent.

16 Claims, 2 Drawing Sheets

SYSTEM AND METHOD FOR PROVIDING A ZERO TRUST NETWORK

FIELD

This disclosure relates generally to computer security and, more particularly, to a system and method for providing a zero trust network.

BACKGROUND

A virtual private network (VPN) is commonly used to extend access to a private network across a public network. The VPN enables users to send and receive data across shared or public networks as if their computing devices were directly connected to the private network. This allows any applications or other resources available on the private network to benefit from the functionality, security, and management of the private network, while providing access to such applications or resources that are inaccessible on the public network without the use of a VPN. VPN's are commonly used for telecommuting workers. A VPN may be created by establishing a virtual point-to-point connection through the use of dedicated circuits or with tunneling protocols over existing networks. From a user's perspective, a VPN allows a user to remotely access all of the resources available within the private network. The data passing along the VPN's virtual point-to-point connection may be encrypted. In addition, a user of a VPN will be required to be authenticated, e.g., by entry of a user credentials such as an identification code and password, before the user will be granted access to the assets (e.g., applications or other resources) available on the private network. One drawback to this approach is that any user, once authenticated, has access to all the of the assets available on the network. This means that a malicious actor (either a user with bad intentions or a third-party who obtained a user's log-in credentials) could attempt to gain access to information or resources beyond the normal access available to the user, e.g., by a brute force attack, etc., via the VPN. Another drawback to this approach is that there is no way to monitor exactly what each remote user is doing during a remote session in order to determine if that user has attempted to gain, or has gained, access to assets that the user is not entitled to access. Yet another drawback is that VPN's typically rely upon a dedicated client installed in the user's remote device (e.g., a computer).

Zero trust networking applies a network security policy that goes beyond providing user access based only on credentials. In zero trust networking, user access and user privileges are limited based on each session to a requested asset at a specific privilege level. The client/server network topology typically used to implement a VPN makes it difficult to implement zero trust networking in conjunction with the VPN.

As can be seen, there is a need for a system and method for providing a zero trust network for access to assets available in a private network in order to overcome the problems recited above.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
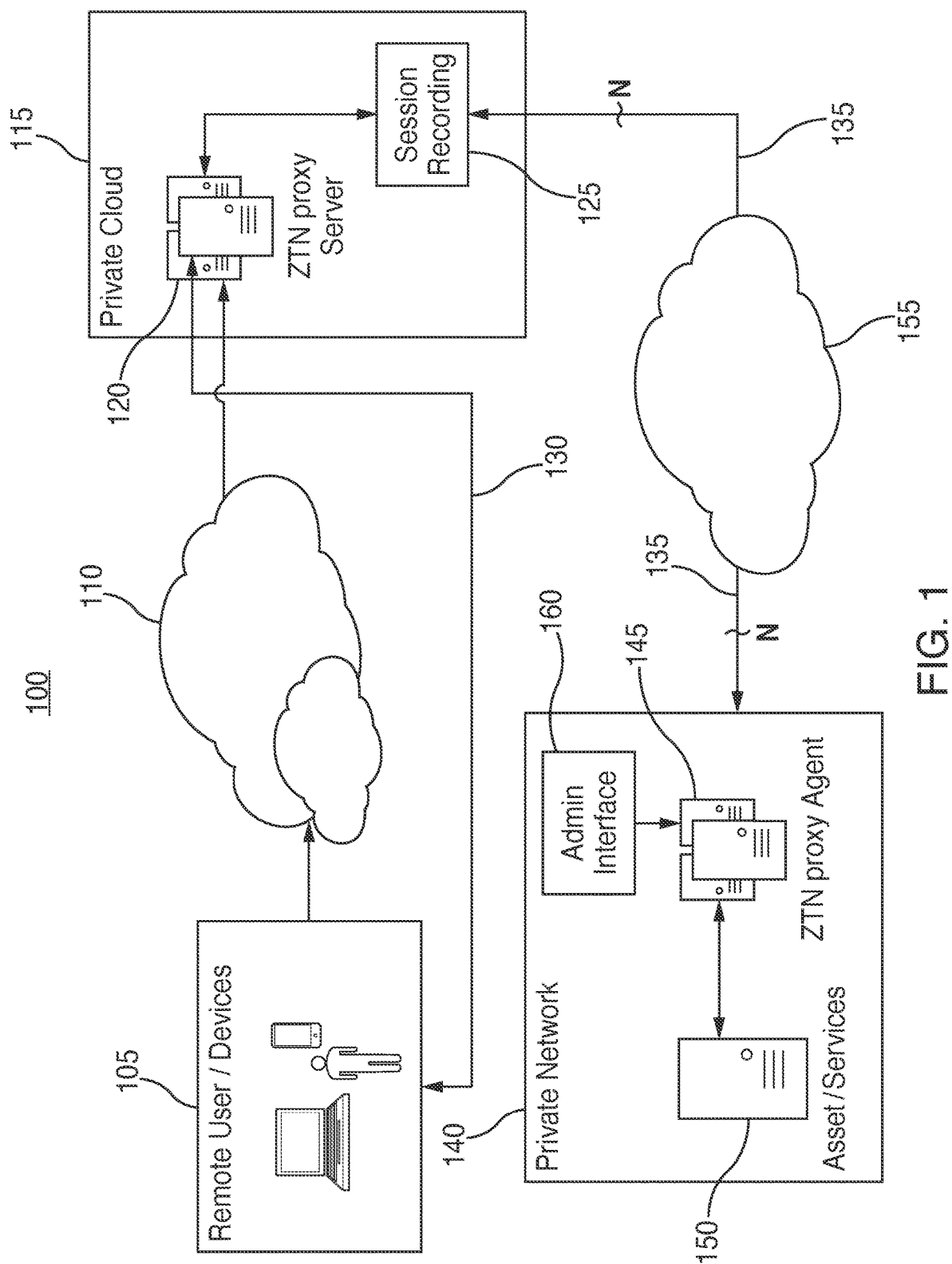
FIG. 1 is a block diagram of a system for providing a zero trust network according to an aspect of the present disclosure.

The ZTN private cloud system 100 shown in FIG. 1 is based on a zero trust security policy where no user is trusted by default, even after verification of user credentials. As explained below, each user is authenticated at every step, no matter what level of security access provided at login, in order to ensure that each user is only able to gain access to authorized assets. ZTN private cloud system 100 includes a private cloud server 115 which acts as an interface between a remote user device 105 and a private network 140. Private cloud server 115 includes a ZTN proxy server 120 which implements a web server for providing access to each user via a wide area network 110 such as the Internet. Private network 140 includes a ZTN proxy agent 145 for interfacing with the ZTN proxy server 120 and for controlling access to assets 150 on the private network 140. A user first accesses the private cloud server 115 via the wide area network 110 by way of a web browser operating on the remote user device 105 and using a dedicated web address (e.g., ztn-_private_cloud_server.com). The ZTN proxy server 120 permits the user to log in using predetermined credentials (e.g., user name and password) via a login page presented by the web server. In some cases, the ZTN proxy server 120 may implement a more robust login scheme using, for example, multi-factor authentication or biometric authentication.

Once a user has their credentials verified, the ZTN proxy server 120 confirms the user's level of access, authentication, the private network 140 associated with the user, and obtains an optional single-use one-time password for the user before allowing the user to access a ZTN dashboard in the user's web browser. The ZTN dashboard identifies a list of the assets 150 on the private network 140 available to that particular user. The list of the assets 150 available to a particular user is defined when that particular user is registered for use with the ZTN private cloud system 100. The available levels of access provided to each user may be decided on a case-by-case basis. In one alternative, the available levels of access may be based on a Role-Based Access Control (RBAC) model which provides access to information and ability to perform operations to a user on only a subset of the resources in a system, with the subset defined based on the particular role or roles an individual user has in an organization. In another alternative, the available levels of access may be based on Attribute-Based Access Control (ABAC), also known as policy-based access control for identity and access management (IAM). ABAC defines an access control paradigm whereby access rights are granted to users through the use of policies which combine attributes together. The policies can use any type of attributes (user attributes, resource attributes, object, environment attributes etc.).

The user then selects only one particular asset among the list of the assets 150 for the current session and, in response to the selection, the ZTN proxy server 120 generates a remote session on the remote user device 105 using a client application that is part of the operating system for the remote user device 105. The user may be required to enter the single-use one-time password in order to access the selected asset via the remote session. For example, when the remote user device 105 is running a version of Microsoft Windows®, the client application will be the Microsoft Remote Desktop Protocol (RDP) application. The use of a Microsoft RDP session (or an equivalent) means that no special client application is required to be installed at the remote user device. The Microsoft RDP session communicates via a secure encrypted channel 130 via the wide area network 110. The ZTN proxy server 120 also requests that ZTN proxy agent 145 generate a secure encrypted channel 135 for communication via wide area network 155 with the ZTN proxy agent 145 located at the private network 140 for the current session and informs ZTN proxy agent 145 which particular asset among the assets 150 is to be made available via the secure encrypted channel 135 for this current session. Wide area network 155 may be the same network as wide area network 110, or be different networks. At least one new secure encrypted channel 135 is created for each user that has logged in to the private cloud server 115, so that when there are N users logged into the private cloud server 115, there will be at least N different secure encrypted channels 135. The private cloud server 115 is also able to connect with different private networks as well, with the particular one of the private networks 140 chosen determined by the stored information for each user and user selections (i.e., in some cases a user may only be allowed to access to one private network and in other cases a user may be able to choose between a number of private networks for access). In either case, in implementing a ZTN framework, the user is only granted access to a single asset on a single private network in a current session.

In a further embodiment, the data stream between the ZTN proxy server 120 and the ZTN proxy agent 145 may be passed via a session recording module 125. The session recording module 125 provides full audit and review capabilities by monitoring and selectively recording all user keystrokes and also selectively creating full videos of browser sessions and selectively storing video links to key moments during a current remote user session.

The ZTN private cloud system 100 backhauls all of the network traffic through a secure tunnel constituting a fully encrypted connection between the remote client on the remote user device 105 and the private network 140. This secure tunnel includes secure encrypted channel 130 and secure encrypted channel 135. The ZTN proxy server 120 and the ZTN proxy agent 145 may implement load balancing by generating one or more additional secure encrypted channels 135 and/or by moving data among the existing secure encrypted channels 135 in order to ensure that the load in each channel is balanced so that each user obtains the fastest possible connection to the private network 140.

The ZTN proxy agent 145 couples the secure encrypted channel 135 to the particular asset selected by the user and ensures that the user has no access whatsoever to other internal assets. This implements zero trust, because even an authorized user is only given access to one asset at a time. Because all of the user commands and data pass through the ZTN proxy agent 145, an administrator at the private network 140 can monitor and review each user session in real time and, via an administrator interface 160, can control (e.g., terminate) the user connection at any time with one click. The private network administrator can also log in to the ZTN dashboard via the web browser running on the ZTN proxy server 120 to set asset access for secure user and entity management.

Figure 2:
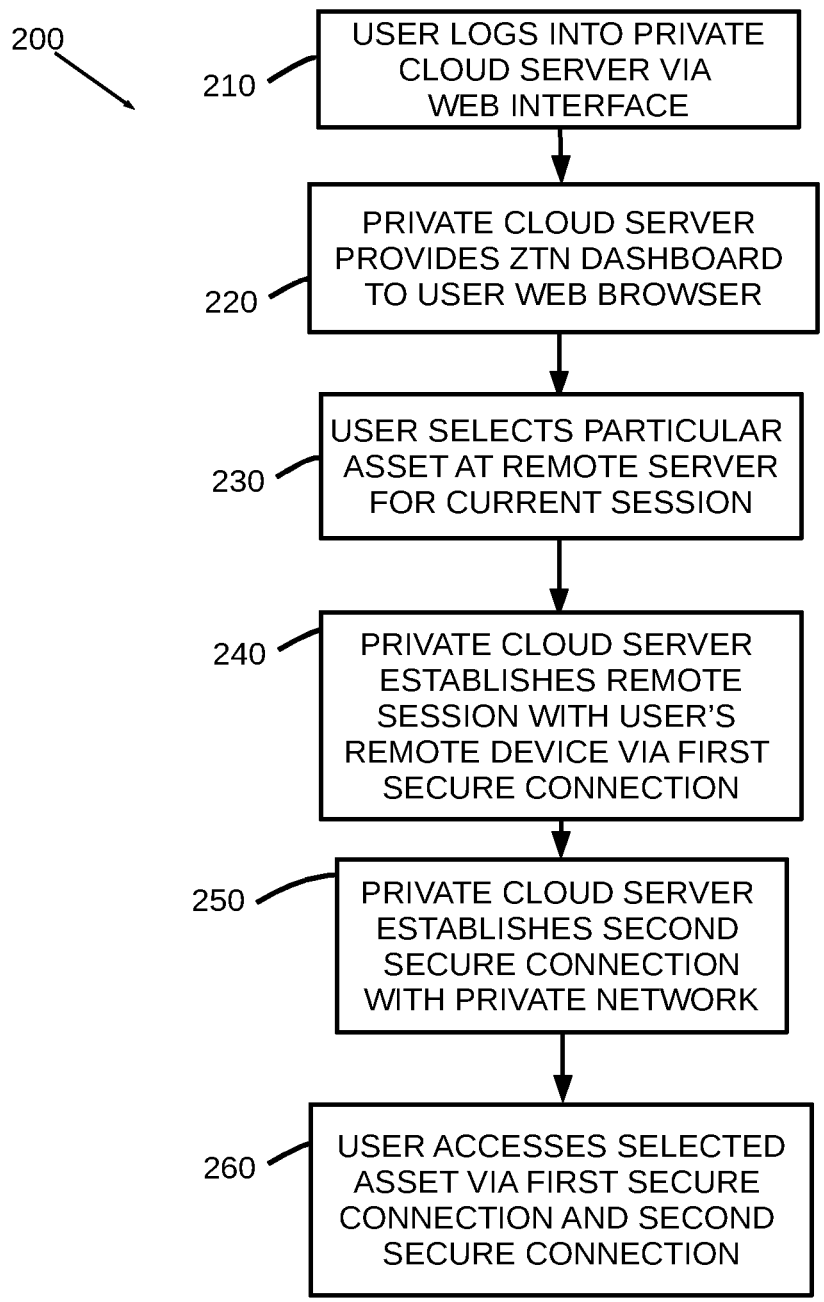
FIG. 2 is a flow chart of a method for providing a zero trust network according to an aspect of the present disclosure.

Referring now to the flowchart 200 in FIG. 2, the ZTN private cloud system 100 operates as follows. First, at step 210, a user logs into the private cloud server 115 via a web interface using the web browser on the user's remote device. Next, once the user's credentials are verified, the private cloud server 115 provides, at step 220, a ZTN dashboard to the user via the user's web browser. The ZTN dashboard provides a list of assets from the private network which are available to this particular user. The user then selects one of the assets for the current session at step 230. The private cloud server 115 then establishes a remote session with the user's remote device via a first secure connection at step 240 and establishes a second secure connection with the private network (via a ZTN proxy agent 145) at step 250. Finally, at step 260, the user accesses the selected asset via the first secure connection and the second secure connection. The user may need to enter a single-use one-time password in order to access the asset via the remote session.

The ZTN private cloud system 100 provides a number of advantages over prior VPN-based systems, including: full remote session control and recording; no remote client install required; private network edge moved to ZTN proxy server/agent boundary; ability to connect with native application and protocols from any remote device; optional biometric authentication with a remote user device; secure remote access that is limited to only certain assets per session; consolidation of the best features from privilege access management into a single security tool; and distributed geolocation base load balancing for the fastest connection to private network internal assets.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for providing remote zero trust access to a private network, comprising:
 a private network having a proxy agent; and
 a cloud server computer for providing a user at a remote device with access to the private network, the cloud server computer having a proxy server for interfacing between the remote device and the private network, the proxy server having a web interface for initiating a session with the user, the proxy server configured to:
 provide a login page via the web interface to allow the user to enter login credentials;
 verify the entered login credentials;
 provide a dashboard page via the web interface for displaying a list of assets available to the user at the private network;
 upon selection of a particular asset by the user, establish a first remote session between a client at the remote device and the proxy server, establish a second remote session between the proxy server and the proxy agent, and inform the proxy agent of the selected particular asset; and
 enable the user to access the selected particular asset via the first remote session, the second remote session, and the proxy agent;

wherein the cloud server computer further comprises a session recording module, the session recording module monitoring a data stream generated by a current remote user session; and wherein the session recording module selectively creates full videos of browser sessions and selectively stores video links to key moments during the current remote user session.

2. The system of claim 1, wherein the proxy agent is configured to provide the user with access to only the selected particular asset.

3. The system of claim 1, wherein the proxy server acts as an interface between the remote device and the private network via a wide area network.

4. The system of claim 3, wherein the first remote session between the client at the remote device and the proxy server is established via the wide area network.

5. The system of claim 1, wherein the second remote session between the proxy server and the proxy agent is established via a wide area network.

6. The system of claim 1, wherein the private network comprises an administrator interface coupled to the proxy agent for monitoring user access.

7. The system of claim 1, wherein the client at the remote device is a Microsoft Remote Desktop Protocol (RDP) application.

8. The system of claim 1, wherein the session recording module selectively records all user keystrokes of the user during the current remote user session.

9. A method for providing remote zero trust access to a private network, comprising:
   providing a login page via a web interface of a proxy server at a cloud server computer to allow a user at a remote device to enter login credentials;
   verifying the entered login credentials at the proxy server;
   providing a dashboard page via the web interface for displaying a list of assets available to the user at a private network;
   upon selection of a particular asset by the user, establishing a first remote session between a client at the remote device and the proxy server, establishing a second remote session between the proxy server and a proxy agent at the private network, and informing the proxy agent of the selected particular asset;
   enabling the user to access the selected particular asset at the private network via the first remote session, the second remote session, and the proxy agent;
   monitoring a data stream generated by a current remote user session via a session recording module; and
   selectively creating full videos of browser sessions via the session recording module and selectively storing video links to key moments via the session recording module during the current remote user session.

10. The method of claim 9, wherein the proxy agent is configured to provide the user with access to only the selected particular asset.

11. The method of claim 9, wherein the proxy server acts as an interface between the remote device and the private network via a wide area network.

12. The method of claim 11, wherein the first remote session between the client at the remote device and the proxy server is established via the wide area network.

13. The method of claim 9, wherein the second remote session between the proxy server and the proxy agent is established via a wide area network.

14. The method of claim 9, comprising monitoring user access to the private network via an administrator interface coupled to the proxy agent.

15. The method of claim 9, wherein the client at the remote device is a Microsoft Remote Desktop Protocol (RDP) application.

16. The method of claim 9, further comprising selectively recording all user keystrokes of the user via the session recording module during the current remote user session.

* * * * *